(12) United States Patent
Marur

(10) Patent No.: US 8,540,605 B2
(45) Date of Patent: Sep. 24, 2013

(54) CONTROL OF TORQUE TRANSFER BETWEEN AN ENGINE AND A MANUAL TRANSMISSION

(75) Inventor: Prabhakar R. Marur, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 372 days.

(21) Appl. No.: 12/904,188

(22) Filed: Oct. 14, 2010

(65) Prior Publication Data
US 2012/0090420 A1 Apr. 19, 2012

(51) Int. Cl.
*B60W 10/02* (2006.01)
*B60W 10/10* (2012.01)

(52) U.S. Cl.
USPC .......................... 477/99; 74/473.19; 192/3.62

(58) Field of Classification Search
USPC .................. 74/473.19; 192/3.62; 477/99
See application file for complete search history.

(56) References Cited

U.S. PATENT DOCUMENTS

| | | | | |
|---|---|---|---|---|
| 1,544,897 A * | 7/1925 | Freeman | | 192/3.62 |
| 2,045,516 A * | 6/1936 | Brewer | | 192/3.59 |
| 2,079,822 A * | 5/1937 | Serra | | 192/3.62 |
| 3,094,202 A * | 6/1963 | Jorg | | 192/3.56 |
| 5,038,901 A * | 8/1991 | Parsons et al. | | 192/3.55 |
| 5,383,823 A * | 1/1995 | Ward et al. | | 477/86 |
| 5,803,217 A * | 9/1998 | Park | | 192/3.31 |
| 5,928,106 A * | 7/1999 | Biros et al. | | 477/81 |
| 5,996,752 A * | 12/1999 | Froehlich | | 192/3.62 |
| 6,148,975 A * | 11/2000 | Shih | | 192/3.62 |
| 2004/0182669 A1* | 9/2004 | Thompson | | 192/3.57 |

FOREIGN PATENT DOCUMENTS

DE 4013299 A1 11/1990

* cited by examiner

*Primary Examiner* — Sherry Estremsky
(74) *Attorney, Agent, or Firm* — Quinn Law Group, PLLC

(57) ABSTRACT

A system for controlling a transfer of torque from an engine to a manual transmission having a plurality of shiftable gears includes a selectively releasable and re-engageable clutch. The clutch is arranged inside the transmission and configured to transmit torque of the engine to the transmission when the clutch is in an engaged state. The system also includes a lever operatively connected to the transmission and movable to shift the gears. Additionally, the system includes an input device arranged on the lever and operable to selectively release and re-engage the clutch. A vehicle employing such a system is also provided.

16 Claims, 3 Drawing Sheets

CONTROL OF TORQUE TRANSFER BETWEEN AN ENGINE AND A MANUAL TRANSMISSION

TECHNICAL FIELD

The invention relates to controlling transfer of torque from an engine to a manual transmission.

BACKGROUND

A manual transmission is a type of transmission used in motor vehicle applications. Manual transmissions are generally characterized by gear ratios that are selectable by locking selected gear pairs to the output shaft inside the transmission.

A vehicle using such a manual transmission employs a coupling device called a clutch for regulating torque transfer from the vehicle's engine to its transmission. Commonly, such a clutch is operated by a foot pedal in order to disconnect the vehicle's engine from its transmission and permit starting of the vehicle from rest, as well as to facilitate the selection of the transmission gear ratios. The actual selection of the gear ratios inside the transmission is typically accomplished via a shift lever movable by the driver.

In general, learning to use the clutch efficiently requires development of muscle memory and a certain level of coordination. Therefore, manual transmissions place a somewhat greater workload on the driver in heavy traffic situations, when the driver must operate the clutch pedal more often.

SUMMARY

A system for controlling a transfer of torque from an engine to a manual transmission having a plurality of shiftable gears includes a selectively releasable and re-engageable clutch. The clutch is arranged inside the transmission and configured to transmit torque of the engine to the transmission when the clutch is in an engaged state. The system also includes a lever operatively connected to the transmission and movable to shift the gears. Additionally, the system includes an input device arranged on the lever and operable to selectively release and re-engage the clutch.

The lever may include a shift knob, and the input device may be arranged on the shift knob.

The system may additionally include an actuator. In such a case, the actuator may be electrically connected to the input device, and may be directly connected to the clutch such that the actuator releases the clutch when the input device is operated. The actuator may be one of an electro-hydraulic type and an electromagnetic type. The actuator and the clutch may also be combined into an integrated clutching device.

The input device may be configured to travel between a fully extended position and a fully depressed position, and may include a biasing spring configured to preload the input device toward the fully extended position. Additionally, the input device may be operated via an application of a force, and may include a pressure sensor configured to sense the force and communicate an electrical signal to the actuator that is proportional to the force. The input device may be operable to modulate the engagement of the clutch by varying the magnitude of the force.

Moreover, the system may include an amplifier. In such a case, the electrical signal communicated from the pressure sensor to the actuator may be conditioned by the amplifier prior to being received by the actuator.

Furthermore, the system may include an ignition switch configured to selectively turn the engine on and off, and an interlock feature configured to prevent the operation of the input device when the engine is turned off by the ignition switch.

Also disclosed is a vehicle having a system for controlling transfer of torque from an engine to a manual transmission, such as described above.

The above features and advantages and other features and advantages of the present invention are readily apparent from the following detailed description of the best modes for carrying out the invention when taken in connection with the accompanying drawings.

DETAILED DESCRIPTION

Figure 1:
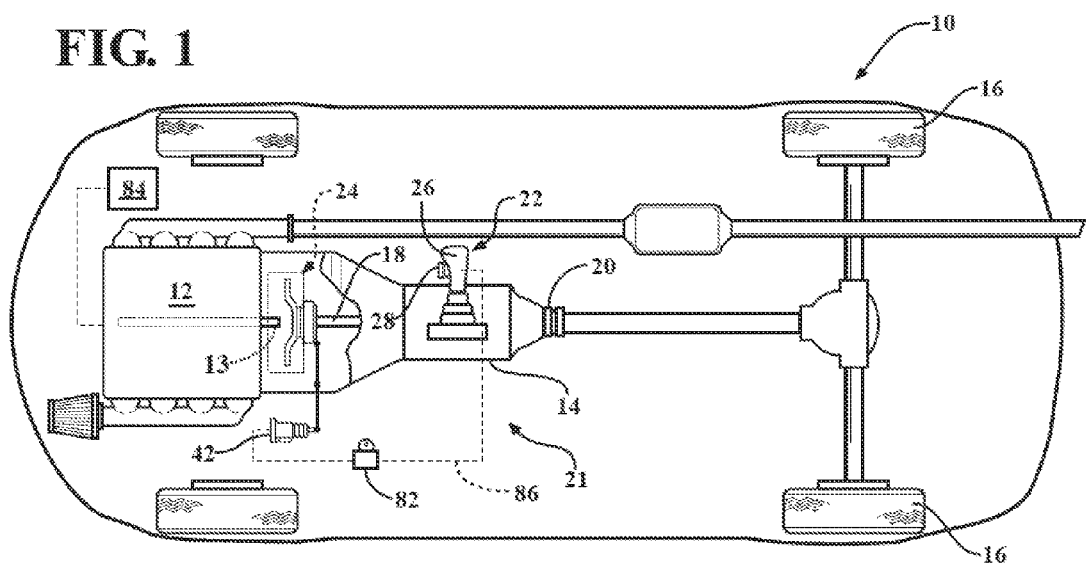
FIG. 1 is a schematic illustration of a vehicle including a system for controlling transfer of torque from an engine to a manual transmission employing a shift lever.

Referring to the drawings, wherein like reference numbers refer to like components, FIG. 1 shows a schematic illustration of a vehicle 10. Vehicle 10 includes an internal combustion engine 12 having a crankshaft 13 operatively connected to a manual transmission 14. The manual transmission 14 is configured to receive torque from a crankshaft 13 of the engine 12 and transmit the torque to the drive wheels 16.

The manual transmission 14 is characterized by a plurality of internal shiftable gears that are assembled into a gear train and are configured to provide multiple gear ratios between an input shaft 18 and an output 20 of the transmission. The gear ratios of the manual transmission 14 are selectable by locking appropriate internal gear pairs to the output 20. Although the vehicle 10 is depicted as having a rear-wheel-drive architecture, nothing precludes the subject vehicle from having other architectures, such as a front- or a four-wheel-drive type.

Vehicle 10 also includes a system 21 for controlling transfer of torque from the engine to a manual transmission 14. Accordingly, the system 21 includes a movable shift lever 22 that is mechanically connected to the manual transmission 14. The shift lever 22 is operable to shift the transmission gears and select desired gear ratios. The shift lever 22 extends into a passenger compartment of the vehicle 10, and is positioned such that an operator or driver of the vehicle 10 may conveniently reach the lever to select desired gear ratios in the manual transmission 14 while operating the vehicle. The system 21 also includes a selectively releasable and re-engageable clutch 24 that is operated by the driver for regulating torque transfer from the crankshaft 13 of the engine 12 to the transmission 14.

Without the clutch 24, the engine 12 and the drive wheels 16 would at all times be continuously linked, and any time the vehicle 10 stopped, the engine would stall. Additionally, without the clutch 24, selecting desired gear ratios inside the transmission would be very difficult, even with the vehicle 10 already in motion, because deselecting a gear while the transmission 14 is under load requires considerable force. Furthermore, selecting a desired gear ratio requires the revolution speed of the engine 12 to be held at a specific value which depends on the rotational speed of the drive wheels 16, as well as on the desired gear ratio.

In a typical vehicle, a clutch is operated by the driver of the vehicle via a foot pedal (not shown). In such a case, when the clutch pedal is fully depressed, the clutch 24 is fully disengaged, and no torque is transferred from the engine 12 to the transmission 14, and therefore no torque is transferred from the transmission to the drive wheels 16. Thus, when the clutch 24 is disengaged, it is possible to select gear ratios or to stop the vehicle 10 without stopping or stalling the engine 12. When the clutch pedal is fully released, the clutch 24 is fully engaged, and practically all the torque of the engine 12 is transferred to the transmission 14. In this coupled state, the clutch 24 does not slip, but rather acts as a rigid coupling, and power is transmitted to the wheels with minimal loss in operating efficiency.

Between the above described extremes of engagement and disengagement, the clutch 24 slips to varying degrees. When the clutch 24 slips, it still transmits torque despite the difference in speeds between the output of the engine 12 and the input to the transmission 14. Because during slippage of the clutch 24, torque of the engine 12 is transmitted by means of frictional contact rather than a direct mechanical connection, considerable power is wasted as heat, and is dissipated by the clutch. When clutch slip is properly applied, such slip allows the vehicle 10 to be started from a standstill, and when the vehicle is already moving, clutch slip allows rotation of engine to gradually adjust to a newly selected gear ratio.

Learning to use a foot pedal operated clutch efficiently requires the development of muscle memory and significant coordination. Therefore, manual transmissions place a somewhat greater workload on the driver in heavy traffic situations, when the driver generally must operate the clutch foot pedal more often than during lighter traffic conditions.

Figure 2:
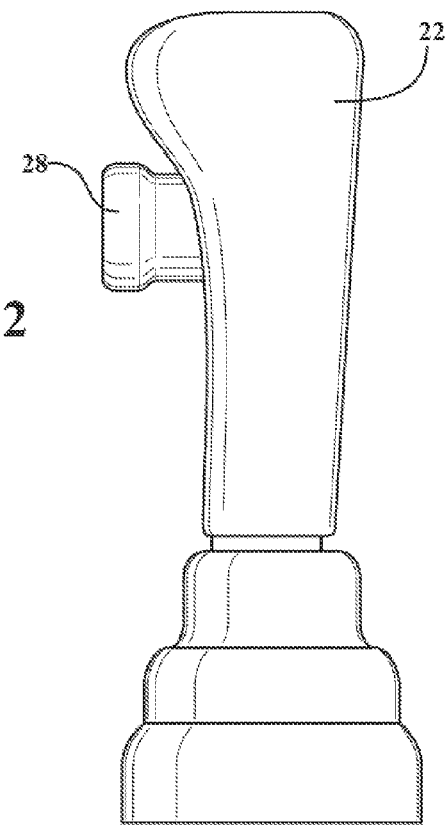
FIG. 2 is an enlarged view of the shift lever shown in FIG. 1.

As shown in FIGS. 1 and 2, the shift lever 22 includes a shift knob 26 that is configured to be gripped by the driver of the vehicle 10. The shift lever 22 includes an input device 28 that is operable by an application of force from the driver. The input device 28 is arranged on the lever and is operable to selectively release and re-engage the clutch 24. The input device 28 is shown as a push button, but may also be configured as any other type of a mechanism, for example, a lever or a switch, that facilitates adequate control over actuation of the clutch 24. As depicted in FIGS. 1 and 2, the input device 28 is located on and incorporated into the shift knob 26, such that the input device may be easily and conveniently reached by the driver during the shifting of the transmission 14.

Figure 3:
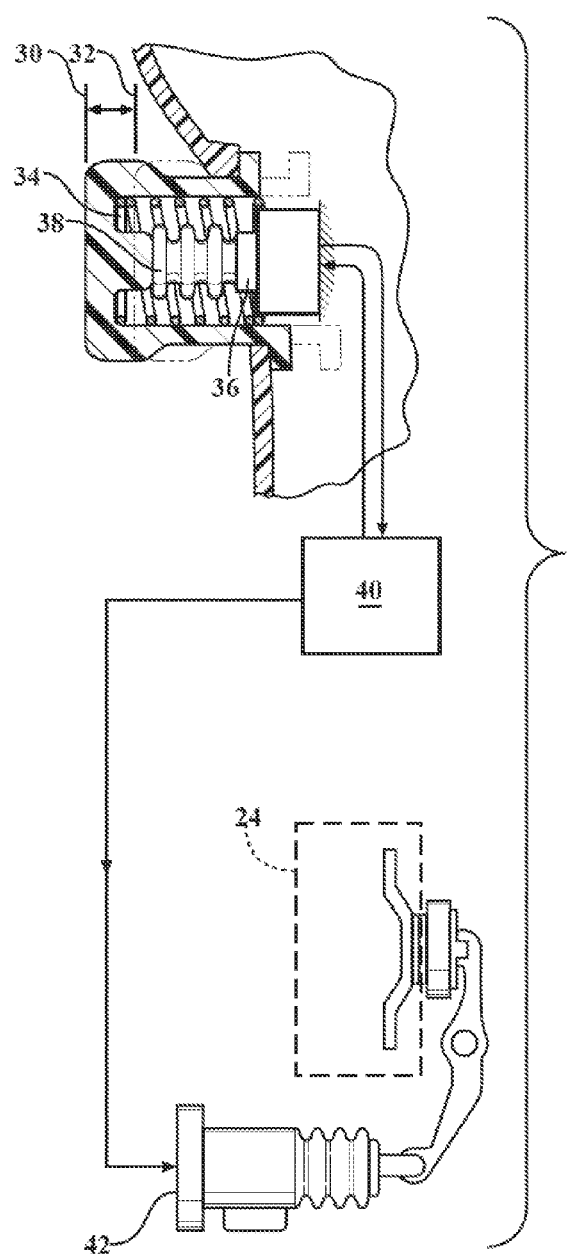
FIG. 3 is a schematic illustration of the system for controlling transfer of torque from an engine to a manual transmission.

FIG. 3 shows a cross-section of the shift lever 22 including a section through the input device 28. The input device 28 is configured to travel between a fully extended position 30 and a fully depressed position 32. The input device 28 includes a biasing spring 34 configured to preload the input device toward the fully extended position 30. The input device 28 also includes a pressure sensor 36. The pressure sensor 36 is configured to sense the force applied by the driver when disengagement of the clutch 24 is desired. The pressure sensor 36 may be configured to receive the applied force at a deformable diaphragm that acts to deform piezo-resistors to change their internal electrical resistance (not shown). When the pressure sensor 36 includes four such piezo-resistors to form a Wheatstone bridge, an outputted voltage from the pressure sensor is proportional to the force applied at the diaphragm.

A bellows 38 is included to shield an actuating mechanism (not shown) that transfers the force applied by the driver to the pressure sensor 36. The pressure sensor 36 is also configured to communicate an electrical signal in the form of an excitation voltage that is proportional to the applied force to a voltage conditioner or amplifier 40. Because the output voltage of pressure sensor 36 is proportional to the applied force, the input device 28 is also operable to modulate the release and the re-engagement of the clutch 24 in response to a variation in the magnitude of the applied force. Such modulation of the release and the re-engagement of the clutch 24 permits additional control over the response of the vehicle 10, facilitates smoothness of operation, and allows the driver to adapt to changing road conditions and vehicle loading.

Following the conditioning of the electrical signal by amplifier 40, the electrical signal is communicated to an actuator 42. The actuator 42 is electrically connected to the input device 28 via the amplifier 40, and is also directly connected to the clutch 24. The actuator 42 is configured to selectively release and re-engage the clutch 24 in response to the electrical signal generated by the driver at the input device 28. The actuator 42 may be an electro-mechanical or electro-magnetic type, and may also be an electro-hydraulic type of a force-transmitting device. In either case, the actuator 42 operates via an electrical actuation, but transmits the force to release and modulate the clutch 24 mechanically.

Figure 4:
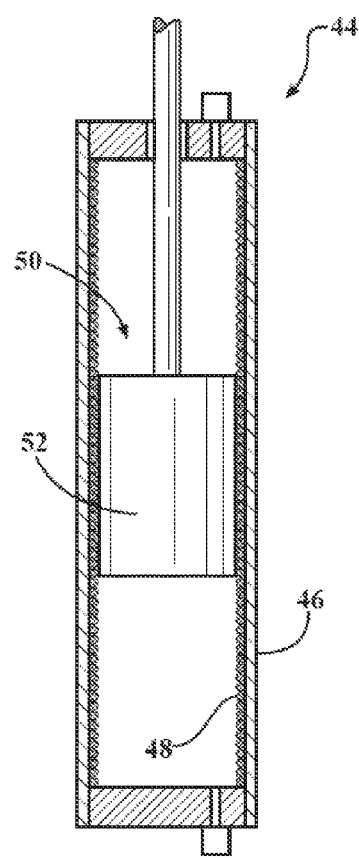
FIG. 4 is a schematic illustration of one type of an electromagnetic clutch actuator for the system shown in FIGS. 1 and 3.

Shown in FIG. 4 is an example of the actuator 42 that is configured as an electromagnetic ram 44. The electromagnetic ram 44 is a three-phase tubular motor that is capable of producing an appropriate thrust force for operating the clutch 24, as well as precise movement at high velocities. The electromagnetic ram 44 includes a cylinder 46, and a coil array 48 that is mounted on the inner surface of the cylinder. The electromagnetic ram 44 also includes a movable armature or piston 50 inside the cylinder 46. A magnet array 52 is mounted on the piston 50. When voltage is applied to the coil 48, a thrust force is generated at the piston 50 that is proportional to the applied voltage.

Figure 5:
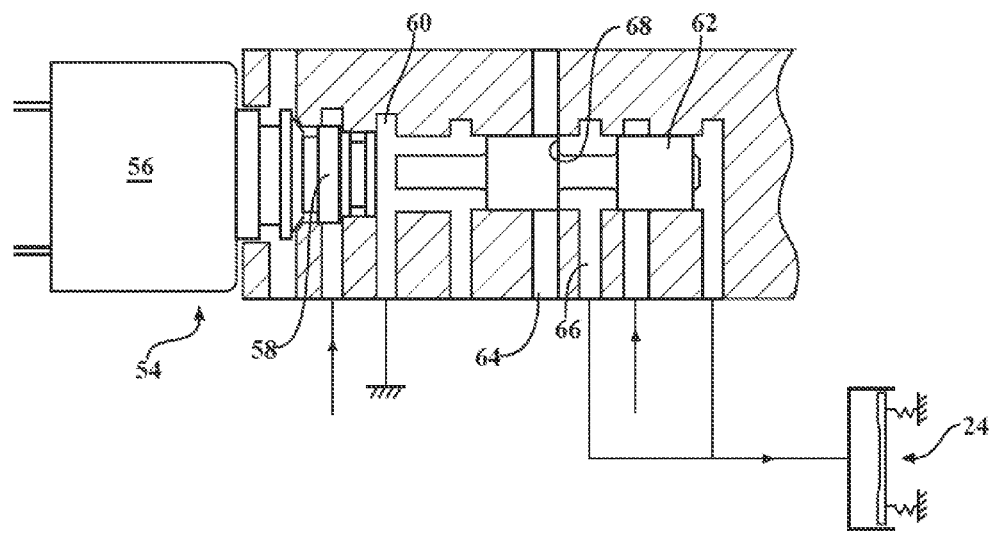
FIG. 5 is a schematic illustration of one type of an electro-hydraulic clutch actuator for the system shown in FIGS. 1 and 3.

Shown in FIG. 5 is an example of the actuator 42 that is configured as an electro-hydraulic actuator or an amplifier valve 54. The electro-hydraulic actuator 54 includes a pulse width modulation (PWM) solenoid 56. The control input to the amplifier valve 54 is a duty cycle of the PWM solenoid 56. By changing the duty cycle, the solenoid plunger 58 is displaced, thus changing hydraulic pressure in a cavity 60. The increased hydraulic pressure in the cavity 60 causes a spool 62 to shift in a direction opposite to that of the PWM solenoid 56. Such movement of the spool 62 closes a vent passage 64. The closure of the vent passage 64, in turn, allows full hydraulic pressure to become available in the hydraulic passage 66 which is operatively connected to the clutch 24. When hydraulic pressure in the cavity 60 is decreased, the spool 62 shifts in a direction back toward the solenoid 56, opens the vent passage 64, and thus reduces pressure in the hydraulic passage 66. For intermediate positions, in order to modulate the clutch 24, a surface 68 of the spool 62 controls the opening of the vent passage 64, and therefore the force applied to the clutch.

Figure 6:
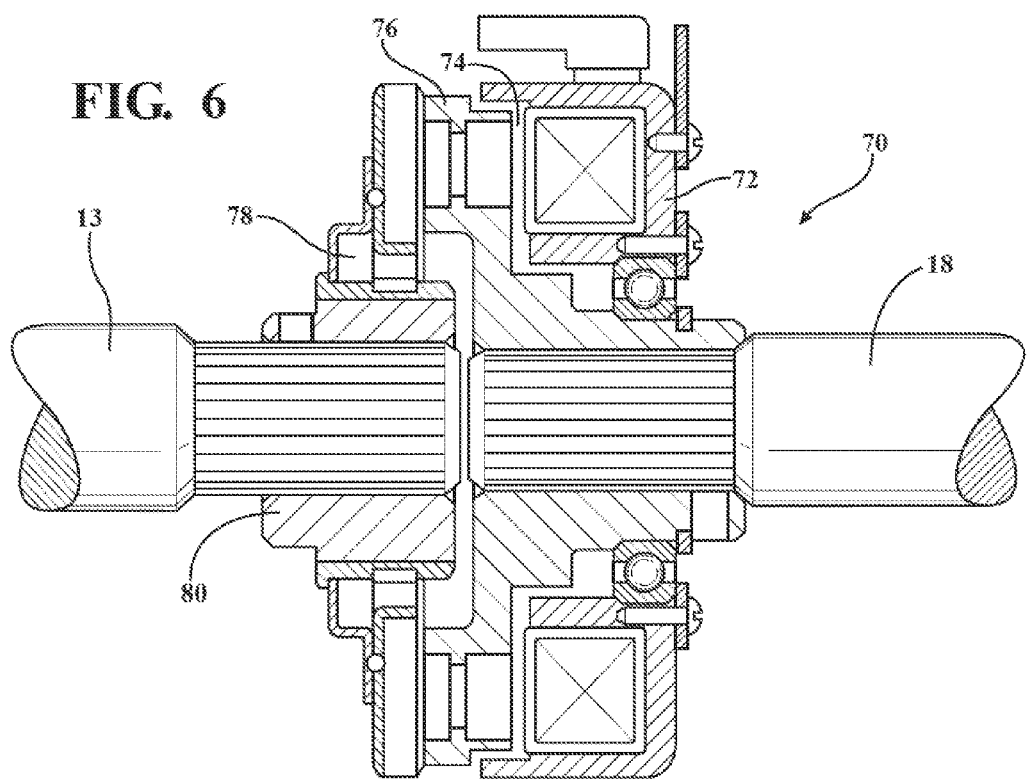
FIG. 6 is a schematic illustration of one type of an integrated clutch and actuator for the system shown in FIGS. 1 and 3.

Shown in FIG. 6 is an example of the actuator 42 and the clutch 24 combined into an integrated clutching device, such as an electromagnetic clutch 70. When the electromagnetic clutch 70 is required to generate a force, voltage/current is applied to a coil 72. The coil 72 turns into an electromagnet and produces magnetic lines of flux. The magnetic flux is then transferred through a small air gap 74 between the coil 72 and a rotor 76. The rotor 76 becomes magnetized and sets up a magnetic loop that attracts an armature 78. The armature 78 is pulled against the rotor 76 and a frictional force is applied at the contact between the armature and the rotor. Within a relatively short time the load is accelerated to match the speed of the rotor, thereby engaging the armature 78 and an output hub 80 of the electromagnetic clutch 70. Typically, the hub 80 constantly rotates with the crankshaft 13 of the engine 12, while the rotor 76 constantly rotates with the input shaft 18 of the transmission 14.

The electromagnetic clutch 70 is operated via an electric actuation, but transmits torque of the engine 10 to the transmission 14 mechanically. During disengagement of the electromagnetic clutch 70, when current/voltage is removed from the actuator 70, the armature 78 is free to turn with the crankshaft of the engine 12. Typically, springs bias the armature 78 away from the rotor 76 when power is released, thus establishing the air gap 74. Cycling of the electromagnetic clutch 70 is achieved by varying the magnitude of voltage/current to the coil 72. The electromagnetic clutch 70 is designed so that there is no relative slip when the electromagnetic clutch is fully engaged, such that torque transfer is 100% efficient. Slippage in the electromagnetic clutch 70 is generally intended to occur only when the vehicle 10 is started from a standstill.

Referring back to FIG. 1, the system 21 additionally includes an ignition switch 82. The ignition switch 82 is configured to selectively turn the engine on and off. The ignition switch 82 is connected to an energy storage device 84 to provide a selective electrical connection between the energy storage device and the engine 12, thus permitting the engine to be started and ran. Furthermore, the system 21 includes an interlock feature 86 configured to prevent the operation of the input device 28 when the engine is turned off by the ignition switch 82. As shown, the interlock feature 86 may be provided by electrically connecting the input device 28 to the ignition switch 82, such that the input device is only operable when the ignition switch is on, or, alternatively, when the ignition switch is on and the engine 12 is running. The interlock feature 86 is thus configured to prevent unintentional release of the clutch 24 and movement of the vehicle 10.

Overall, the system 21 either supplants the foot-operated clutch pedal with the hand operated input device 28, or includes the input device in parallel with the pedal, thus facilitating actuation of the clutch 24 by the driver's hand rather than his or her foot. Therefore, the system 21 permits the driver to reduce the workload on his or her foot in heavy traffic situations, when the driver is generally forced to operate the clutch more often than during lighter traffic conditions.

While the best modes for carrying out the invention have been described in detail, those familiar with the art to which this invention relates will recognize various alternative designs and embodiments for practicing the invention within the scope of the appended claims.

The invention claimed is:

1. A system for controlling a transfer of torque from an engine to a manual transmission having a plurality of shiftable gears, the system comprising:
   a selectively releasable and re-engageable clutch arranged relative to the manual transmission and configured to transmit torque of the engine to the transmission when the clutch is in an engaged state;
   a lever operatively connected to the transmission and movable to shift the gears;
   an input device arranged on the lever and operable to selectively release and re-engage the clutch; and
   an actuator, wherein the actuator is electrically connected to the input device and is directly connected to the clutch such that the actuator selectively releases and re-engages the clutch when the input device is operated;
   wherein the input device is operated via an application of a force and includes a pressure sensor configured to sense the force and communicate an electrical signal to the actuator that is proportional to the force.

2. The system of claim 1, wherein the lever includes a shift knob, and the input device is arranged on the shift knob.

3. The system of claim 1, wherein the actuator is one of an electro-hydraulic type and an electromagnetic type.

4. The system of claim 1, wherein the actuator and the clutch are combined into an integrated clutching device.

5. The system of claim 1, wherein the input device is configured to travel between a fully extended position and a fully depressed position, and includes a biasing spring configured to preload the input device toward the fully extended position.

6. The system of claim 1, wherein the input device is operable to modulate the release and the re-engagement of the clutch in response to a variation in the magnitude of the applied force.

7. The system of claim 1, further comprising an amplifier, wherein the electrical signal communicated from the pressure sensor to the actuator is conditioned by the amplifier prior to being received by the actuator.

8. The system of claim 1, further comprising an ignition switch configured to selectively turn the engine on and off, and an interlock feature configured to prevent the operation of the input device when the engine is turned off by the ignition switch.

9. A vehicle comprising:
   an internal combustion engine configured for powering the vehicle;
   a transmission having a plurality of shiftable gears, wherein the transmission is operatively connected to the engine, and is adapted to transmit torque of the engine to power the vehicle;
   a manually releasable and re-engageable clutch arranged inside the transmission, the clutch being configured to transmit torque of the engine to the transmission when the clutch is in an engaged state;
   a lever arranged in the vehicle and operable to shift the gears in the transmission;
   an input device arranged on the lever and operable to release the clutch such that the gears may be shifted; and
   an actuator, wherein the actuator is electrically connected to the input device and is directly connected to the clutch such that the actuator selectively releases and re-engages the clutch when the input device is operated;
   wherein the input device is operated via an application of a force and includes a pressure sensor configured to sense the force and communicate an electrical signal to the actuator that is proportional to the force.

10. The vehicle of claim 9, wherein the lever includes a shift knob, and the input device is arranged on the shift knob.

11. The vehicle of claim 9, wherein the actuator is one of an electro-hydraulic type and an electromagnetic type.

12. The vehicle of claim 9, wherein the actuator and the clutch are combined into an integrated clutching device.

13. The vehicle of claim 9, wherein the input device is configured to travel between a fully extended position and a fully depressed position, and includes a biasing spring configured to preload the input device toward the fully extended position.

14. The vehicle of claim 9, wherein the input device is operable to modulate the release and the re-engagement of the clutch in response to a variation in the magnitude of the applied force.

15. The vehicle of claim 9, further comprising an amplifier, wherein the electrical signal communicated from the pressure sensor to the actuator is conditioned by the amplifier prior to being received by the actuator.

16. The vehicle of claim 9, further comprising an ignition switch configured to selectively turn the engine on and off, and an interlock feature configured to prevent the operation of the input device when the engine is turned off by the ignition switch.

* * * * *